Patented Mar. 12, 1929.

1,705,453

UNITED STATES PATENT OFFICE.

OMER DEMARET, OF MARCHIENNE-AU-PONT, BELGIUM.

PROCESS OF TREATING GLASS PLATES AND THE LIKE TO PREVENT MOISTURE AFFECTING THEIR TRANSPARENCY.

No Drawing. Application filed April 19, 1927, Serial No. 185,082, and in Belgium April 27, 1926. Renewed October 12, 1928.

This invention relates to the treatment of glass plates and panes which are exposed to moisture, as in the case of wind shields for motor cars, window panes of tramway cars, bath room mirrors etc. with a view to preserving their transparency and preventing their being dimmed by the condensation of steam or mist or the settling of rain drops.

Various means have been proposed to attain this object but it has been found that these are only of little efficacy or they require the application of a substance such as gelatine or glycerine which must frequently be renewed.

The present invention makes it possible to avoid these inconveniences. It is based on the observation that a transparent sheet or film of coagulated or reverted cellulose, such as the product known in the trade under the name of "cellophane", loses its faculty of retaining the particles of moisture or the drops of water settling thereon, when it has been treated with an alkaline bath, said drops or particles then immediately spreading and running off in a sheet of uniform thickness without at any time obscuring the view. Furthermore, once they have been thus treated, the sheets or films of coagulated cellulose permanently retain their properties and they can be cleaned like the glass itself without requiring any further treatment. My invention therefore covers the treatment of such sheets or films, the treated products and the transparent articles coated or covered therewith.

In carrying out my invention I preferably proceed as follows:

A sheet of coagulated cellulose or cellophane is well cleaned and smoothed or calendered, whereupon it is treated with a 50% solution of caustic potash at a temperature of about 30° C. for 25 to 30 minutes. After having been washed with running water the plate is dipped in a weak solution of hydrochloric acid and then washed again with running water for say 15 minutes and dried in the open air. The sheet is then ready for use and may be secured to the glass surface to be protected by means of any colorless glue such as fish glue.

According to a modification, the sheet of coagulated cellulose, after cleaning and smoothing, is glued onto the glass which may be previously washed with a weak solution of hydrochloric acid and ammonia and then dried at a temperature of 60 to 70° C.

The glass plate with the transparent sheet glued thereon is preferably passed between smoothing rolls and dried again at a moderate temperature. It then is immersed in the alkaline bath for a period of 25 to 30 minutes and successively washed with running water, with a weak acid solution, with water again and dried as above set forth.

The manner of carrying out the invention may of course be varied in other details without departing from the scope of my invention.

I claim:

1. A process of treating glass surfaces, consisting in coating same with a transparent sheet of coagulated cellulose treated with an alkaline bath.

2. A process of treating glass plates and the like, consisting in immersing a transparent sheet of coagulated cellulose in an alkaline bath, washing it with water and with a weak acid solution, drying said sheet and gluing it onto the glass plate.

3. A process of treating glass plates and the like, consisting in cleaning and smoothing a transparent sheet of coagulated cellulose, immersing it in a 50% solution of caustic potash for 25 to 30 minutes, washing and drying said sheet, and gluing it onto the glass plate.

4. As a novel article of manufacture for use in coating glass surfaces, a transparent sheet of coagulated cellulose treated with an alkaline solution and having the property of dispersing drops of water and particles of moisture.

5. As a novel article of manufacture, a glass plate having glued thereon a transparent sheet of coagulated cellulose treated with an alkaline solution and having the property of dispersing drops of water and particles of moisture.

OMER DEMARET.